United States Patent
Gopalan et al.

(10) Patent No.: US 11,782,747 B2
(45) Date of Patent: Oct. 10, 2023

(54) SYSTEM AND METHOD FOR NOTEBOOK PROCESSING TO HANDLE JOB EXECUTION IN CROSS-CLOUD ENVIRONMENT

(71) Applicant: DECISIONFORCE LLC, Santa Clara, CA (US)

(72) Inventors: Sriram Gopalan, Santa Clara, CA (US); Prabhu Raghav, Chennai (IN)

(73) Assignee: DECISIONFORCE LLC, Santa Clara, CA (US)

( * ) Notice: Subject to any disclaimer, the term of this patent is extended or adjusted under 35 U.S.C. 154(b) by 375 days.

(21) Appl. No.: 17/153,129

(22) Filed: Jan. 20, 2021

(65) Prior Publication Data
US 2022/0229682 A1 Jul. 21, 2022

(51) Int. Cl.
*G06F 9/455* (2018.01)
*G06F 9/48* (2006.01)
*G06F 9/50* (2006.01)
*G06F 9/54* (2006.01)
*G06N 20/00* (2019.01)

(52) U.S. Cl.
CPC ........ *G06F 9/45558* (2013.01); *G06F 9/4881* (2013.01); *G06F 9/5072* (2013.01); *G06F 9/541* (2013.01); *G06N 20/00* (2019.01); *G06F 2009/4557* (2013.01); *G06F 2009/45562* (2013.01); *G06F 2009/45575* (2013.01)

(58) Field of Classification Search
CPC .. G06F 9/45558; G06F 9/4881; G06F 9/5072; G06F 9/541; G06F 2009/45562; G06F 2009/4557; G06F 2009/45575; G06N 20/00
See application file for complete search history.

(56) References Cited

U.S. PATENT DOCUMENTS

| | | |
|---|---|---|
| 9,306,868 B2 | 4/2016 | Ferris et al. |
| 9,983,859 B2 | 5/2018 | Mascaro et al. |
| 9,990,230 B1 | 6/2018 | Stoica et al. |
| 10,474,736 B1 | 11/2019 | Stoica et al. |
| 10,572,321 B2 | 2/2020 | Khare et al. |
| 10,678,536 B2 | 6/2020 | Hunter et al. |
| 2017/0017903 A1 | 1/2017 | Gray et al. |
| 2018/0137525 A1 | 5/2018 | Cotton |
| 2019/0377597 A1* | 12/2019 | Yuan ........................ G06F 21/44 |
| 2020/0097847 A1 | 3/2020 | Convertino et al. |

(Continued)

*Primary Examiner* — Wissam Rashid
(74) *Attorney, Agent, or Firm* — Jason C. Cameron (57) ABSTRACT

A system for notebook processing to handle job execution in cross-cloud environment is disclosed. A decision force assistant to receive one or more job requests representative of execution of one or more projects, parses the one or more job requests received; a decision force engine launches one or more virtual machines on a cloud-based platform, sends one or more job instructions associated with the one or more job requests to the decision force assistant, enables the decision force assistant to fetch at least one input file corresponding to the one or more job instructions; a job execution engine runs one or more web-based notebooks in a sequential manner, enables the decision force assistant to fetch the at least one input file for execution of the one or more job requests on the one or more web-based notebooks, generates a job associated output, to generate a job execution status.

17 Claims, 6 Drawing Sheets

(56) References Cited

U.S. PATENT DOCUMENTS

2020/0364606 A1   11/2020  Sawant et al.
2021/0286657 A1*  9/2021   Mathur ................. G06F 9/5027
2022/0156062 A1*  5/2022   Kroth ........................ G06F 8/30

* cited by examiner

SYSTEM AND METHOD FOR NOTEBOOK PROCESSING TO HANDLE JOB EXECUTION IN CROSS-CLOUD ENVIRONMENT

BACKGROUND

Embodiments of the present disclosure relate to an automated project execution system and more particularly to a notebook processing system and a method to handle job execution in cross-cloud environment.

In today's age of growing engineering complexity, connected products and the Internet of Things (IoT) are changing a way of work and life. Engineering teams of any enterprise are facing pressure to quickly adapt to the pace of change in nearly every industry, with more data than ever to leverage. The engineering team knows, requirements management is critical to the success of any project. Poor requirements definition results in project delays, cost overruns, and poor product quality. As a result, the engineering teams utilizes various systems in order to achieve end to end engineering lifecycle for delivering new innovations in requirements management for systems engineers.

Conventionally, the system available for execution of business projects for the engineering teams includes a standard method to input one or more parameters and requires manual intervention to go through several steps to run a job associated with machine learning or artificial intelligence technology. However, the manual intervention required by such a conventional system makes auditing of input parameters difficult. Also, such a conventional system is unable to analyze a project's requirement, suggests one or more improvements that leverage industry with one or more best practices and brings one or more new features to improve requirements quality early in a project by making the search, peer collaboration and job execution all together in an integrated platform. Moreover, such a conventional system decreases self-service usage for job execution which results in engagement for back-and-forth steps between users and data scientists and affects productivity. Furthermore, such a conventional system requires data scientists or any engineers to write or to handle workflow automations with schedulers which further requires domain knowledge and expertise.

Hence, there is a need for an improved system and a method for notebook processing to handle job execution in cross-cloud environment in order to address aforementioned issues.

BRIEF DESCRIPTION

In accordance with an embodiment of the present disclosure, a system for notebook processing to handle job execution in cross-cloud environment is disclosed. The system includes a processing subsystem hosted on a server and configured to execute on a network to control bidirectional communications among a plurality of elements. The processing subsystem includes a decision force assistant configured to receive one or more job requests representative of execution of one or more projects from one or more sources in one or more formats. The decision force assistant is also configured to parse the one or more job requests received for interpretation using a data parsing technique. The processing subsystem also includes a decision force operatively coupled to the decision force assistant. The decision force engine is configured to launch one or more virtual machines on a cloud-based platform based on the one or more job requests received. The decision force engine is also configured to send one or more job instructions associated with the one or more job requests to the decision force assistant via a messaging technique upon successful launching of the one or more virtual machines. The decision force engine is also configured to enable the decision force assistant to fetch at least one input file corresponding to the one or more job instructions from an external storage repository. The processing subsystem also includes a job execution engine operatively coupled to the decision force engine. The job execution engine is configured to run one or more web-based notebooks in a sequential manner by importing a notebook configuration file from the external storage repository. The job execution engine is also configured to enable the decision force assistant to fetch the at least one input file for execution of the one or more job requests on the one or more web-based notebooks. The job execution engine is also configured to generate a job associated output upon execution of the at least one input file corresponding to the one or more job requests on the one or more web-based notebooks. The job execution engine is also configured to generate a job execution status for storing in a status information database based on the job associated output generated.

In accordance with another embodiment of the present disclosure, a method for notebook processing to handle job execution in cross-cloud environment is disclosed. The method includes receiving, by a decision force assistant, one or more job requests representative of execution of one or more projects from one or more sources in one or more formats. The method also includes parsing, by the decision force assistant the one or more job requests received for interpretation using a data parsing technique. The method also includes launching, by the decision force engine, one or more virtual machines and Kubernetes cluster on a cloud-based platform based on the one or more job requests received. The method also includes sending, by the decision force engine, one or more job instructions associated with the one or more job requests to the decision force assistant via a messaging technique upon successful launching of the one or more virtual machines. The method also includes enabling, by the decision force engine, the decision force assistant to fetch at least one input file corresponding to the one or more job instructions from an external storage repository. The method also includes running, by a job execution engine, one or more web-based notebooks in a sequential manner by importing a notebook configuration file fetched from the external storage repository. The method also includes enabling, by the job execution engine, the decision force assistant to fetch the at least one input file for execution of the one or more job requests on the one or more web-based notebooks. The method also includes generating, by the job execution engine, a job associated output upon execution of the at least one input file corresponding to the one or more job requests on the one or more web-based notebooks. The method also includes generating, by the job execution engine, a job execution status for storage in a status information database based on the job associated output generated.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for notebook processing to handle job execution in cross-cloud environment. The system includes a processing subsystem hosted on a server and configured to execute on a network to control bidirectional communications among a plurality of elements. The processing subsystem includes a decision force assistant configured to receive one or more job requests representative of execution of one or more projects from one or more sources in one or more formats. The decision force assistant is also configured to parse the one or more job requests received for interpretation using a data parsing technique. The processing subsystem also includes a decision force operatively coupled to the decision force assistant. The decision force engine is configured to launch one or more virtual machines on a cloud-based platform based on the one or more job requests received. The decision force engine is also configured to send one or more job instructions associated with the one or more job requests to the decision force assistant via a messaging technique upon successful launching of the one or more virtual machines. The decision force engine is also configured to enable the decision force assistant to fetch at least one input file corresponding to the one or more job instructions from an external storage repository. The processing subsystem also includes a job execution engine operatively coupled to the decision force engine. The job execution engine is configured to run one or more web-based notebooks in a sequential manner by importing a notebook configuration file from the external storage repository. The job execution engine is also configured to enable the decision force assistant to fetch the at least one input file for execution of the one or more job requests on the one or more web-based notebooks. The job execution engine is also configured to generate a job associated output upon execution of the at least one input file corresponding to the one or more job requests on the one or more web-based notebooks. The job execution engine is also configured to generate a job execution status for storing in a status information database based on the job associated output generated.

Figure 1:
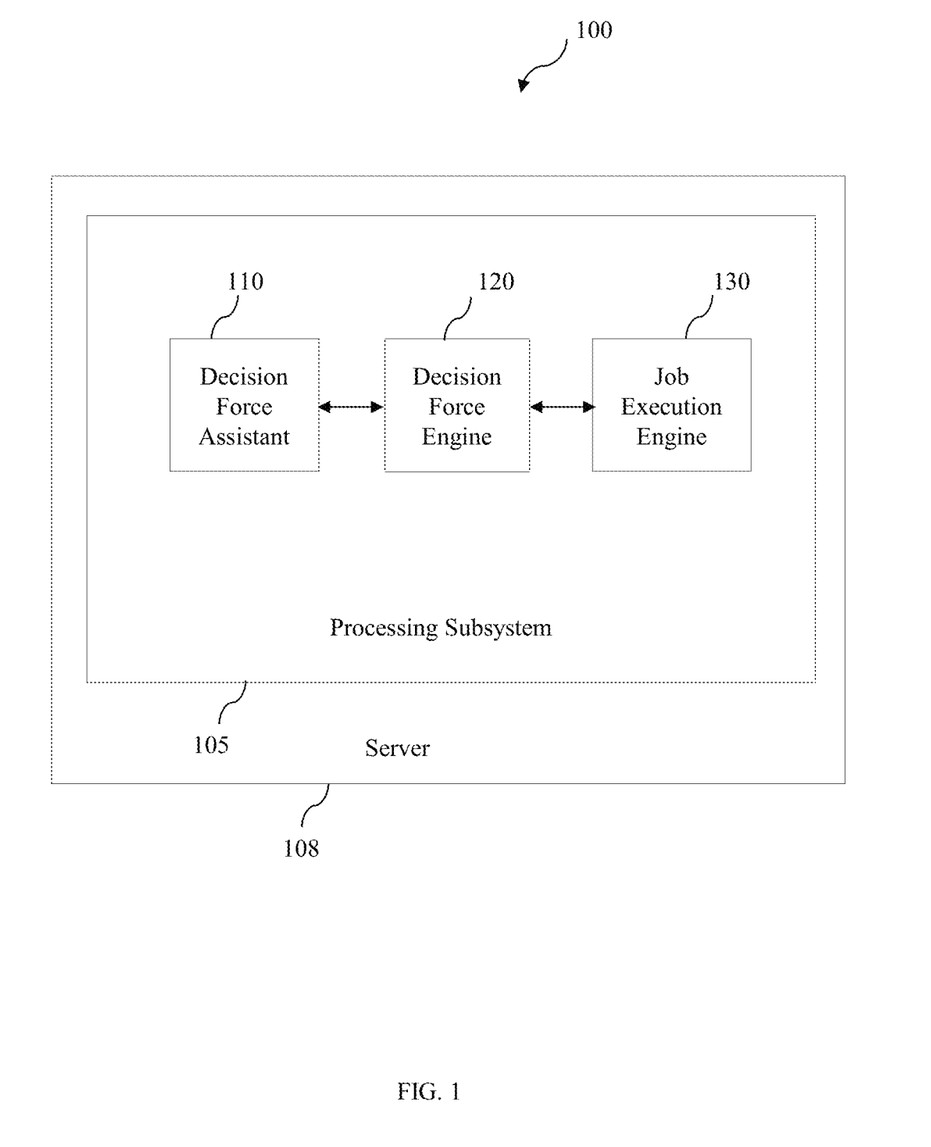
FIG. 1 is a block diagram of a system for notebook processing to handle job execution in cross-cloud environment in accordance with an embodiment of the present disclosure.

FIG. 1 is a block diagram of a system 100 for notebook processing to handle job execution in cross-cloud environment in accordance with an embodiment of the present disclosure. The system 100 includes a processing subsystem 105 hosted on a server 108. In one embodiment, the server 108 may include a cloud server. In another embodiment, the server 108 may include a local server. The processing subsystem 105 is configured to execute on a network (not shown in FIG. 1) to control bidirectional communications among a plurality of elements. In one embodiment, the network may include a wired network such as local area network (LAN). In another embodiment, the network may include a wireless network such as wi-fi, Bluetooth, Zigbee, near field communication (NFC), infra-red communication (RFID) or the like. The processing subsystem 105 includes a decision force assistant 110 configured to receive one or more job requests representative of execution of one or more projects from one or more sources in one or more formats. In one embodiment, the one or more job requests may include one or more machine learning based job requests for training or testing one or more machine learning models. In such embodiment, the one or more job requests are received from the one or more sources which may include, but not limited to, a user or a scheduled event for triggering the one or more job requests. In one embodiment, the one or more formats may include at least one of a voice format, a text format or a combination thereof.

The decision force assistant 110 is also configured to parse the one or more job requests received for interpretation using a data parsing technique. When the user such as a business user submits the one or more job requests through voice or text-based entry, the decision force assistant automatically parses the one or more job requests and injects different parameters into a decision force engine. In one embodiment, the data parsing technique may include a recursive descent parsing technique, a predictive parsing technique, a left-left (LL) parsing technique, a left-right (LR) parsing technique, a simple left-right (SLR) parsing technique or a look ahead left-right (LALR) parsing technique. Parsing of the one or more job requests helps in understanding business requirement associated with the one or more projects.

Figure 2:
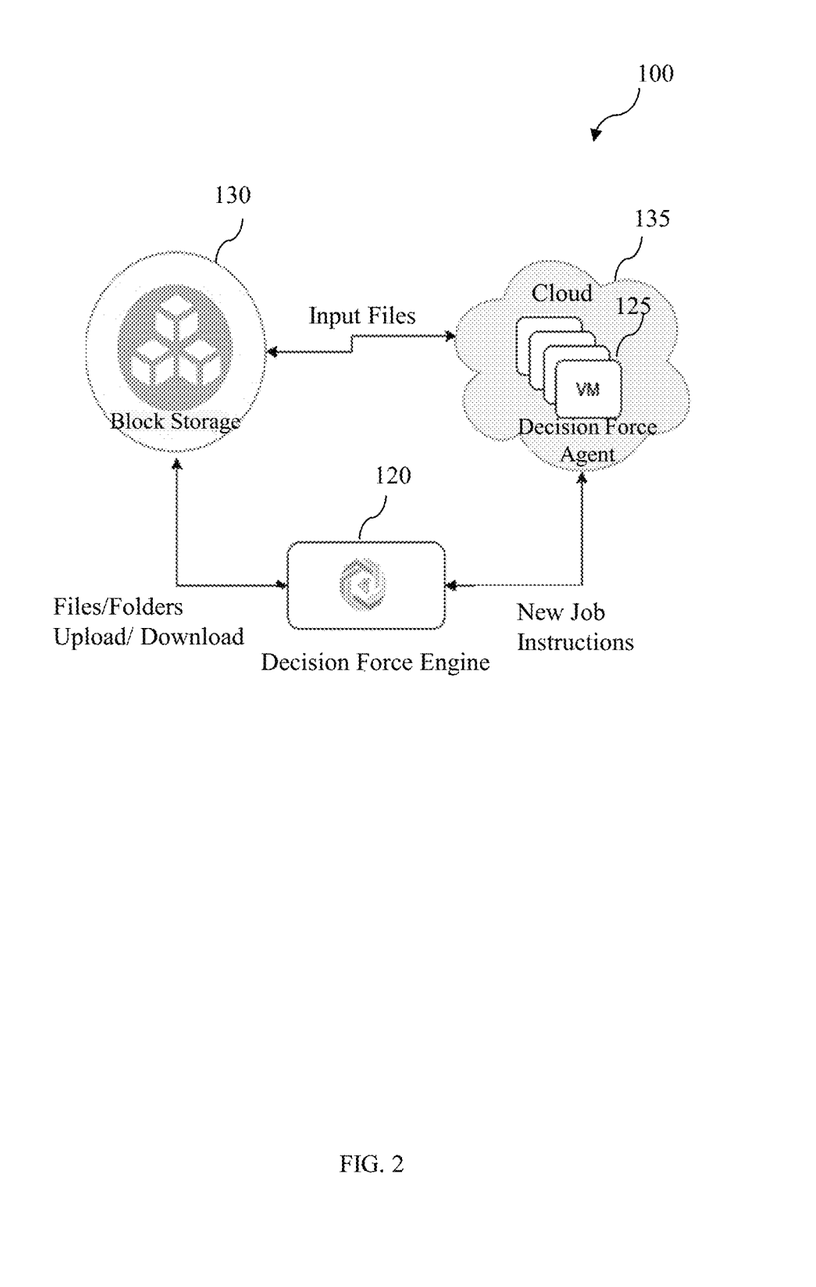
FIG. 2 represents a schematic representation of an embodiment of a decision force job execution in a cross-cloud environment of a system of FIG. 1 in accordance with an embodiment of the present disclosure.

The processing subsystem 105 also includes a decision force engine 120 operatively coupled to the decision force assistant 110. The decision force engine 120 is configured to launch one or more virtual machines on a cloud-based platform based on the one or more job requests received. When a new job request arrives, the Decision Force engine 120 launches the one or more VMs 125 on AWS cloud 135. Upon successful VM launch, the Decision Force assistant registers the VM details to Decision Force engine. The Decision force engine further sends the one or more job instructions to the launched VM via advanced message queuing protocol (AMQP) message. In such embodiment, the AMQP messaging technique listens to an application programming interface to get the one or more job instructions. In one embodiment, the one or more virtual machines (VMs) are launched on an external cloud-based platform provided by a cloud service provider for performing one or more cloud computing services. In such embodiment, the one or more virtual machines are launched on the cloud-based platform using a corresponding cloud service provider's application programming interface (API). In a specific embodiment, the external cloud-based platform may include, but not limited to, an Amazon Web Services™ (AWS) cloud-based platform, Microsoft Azure™ cloud-based platform and a Google™ cloud-based platform. On such embodiment of the decision force job execution in a multi-cloud environment of a system is represented. FIG. 2.

Referring to FIG. 1, once, the one or more VMs are launched, Kubernetes™ clusters are launched on demand for automating computer application deployment, scaling, and management. The Kubernetes is feasibly applied to manage the one or more virtual machines that normally runs in a cloud or virtualization platform. The Kubernetes (K8) clusters helps one or more data scientists to abstract to manage cloud resources and let the one or more data scientists or users to focus on their business models. The decision force assistant also provides a user-friendly interface by hiding launching of the one or more K8 cluster complexities from the users and minimize the launching or managing clusters development operations (DevOps) skills.

The decision force engine 120 is also configured to send one or more job instructions associated with the one or more job requests to the decision force assistant via a messaging technique upon successful launching of the one or more virtual machines. The decision force engine 120 is also configured to enable the decision force assistant to fetch at least one input file corresponding to the one or more job instructions from an external storage repository. In one embodiment, the at least one input file may include at least one of an input data source file, at least one machine learning code file, at least one configuration file or a combination thereof. In such embodiment, the at least one input data source file may include one or more input datasets associated with one or more real-life business use cases. In another embodiment, the at least one machine learning code file may include at least one of a file of one or more machine learning procedures, a file of one or more machine learning data models or a combination thereof. As used herein, the term 'one or more machine learning procedure' is defined as mathematical technique that is run on data for performing a particular task and generates an output. Similarly, the term 'one or more machine learning models' is defined as an output of a machine learning technique or a procedure that runs on data and represents what was learned by a machine learning technique.

The processing subsystem 105 also includes a job execution engine 130 operatively coupled to the decision force engine 120. The job execution engine 130 is configured to run one or more web-based notebooks in a sequential manner by importing a notebook configuration file from the external storage repository. In one embodiment, the one or more web-based notebooks may include, but not limited to a Jupyter™ Notebook, PyCharm™ integrated development environment (IDE), RStudio™ IDE, Spark™ Notebook and the like. In some embodiment, the external storage repository may include a cloud storage bucket of an external service provider. In some embodiment, the cloud storage bucket may include a Google cloud storage bucket. In such embodiment, the cloud storage bucket is connected via a cloud connector and an executor.

The system 100 provides default storage option as Google Cloud Storage and files/folders segregates between tenants. The default storage provided by the external storage repository internally uses single cloud bucket and manages tenant folders as abstract layer and ensures files and folders are secured. Also, the external storage repository has an option to store files in encrypted mode. The external storage repository provided by the external service provider also enables a feature to bring your own cloud storage (BYOC). In the external storage repository, a tenant admin may configure his or her own enterprise cloud storage account and also has an ability to mount any other cloud storages and also any NFS storages as well. It has the option to copy, move or extract files from one cloud to another cloud by using the platform interface. On the Kubernetes job clusters, the storage services automatically mount inside the one or more VMs to provide the option for the Jupyter notebooks to access required files from the storage. For example, one or more data science models require large datasets in order to train a feature with high central processing unit (CPUs) and random-access memory (RAMs) or graphics processing unit (GPU) clusters. The job execution engine also provides the high flexibility to create VM clusters and storage be mounted as local drive for the notebooks to get datasets access in seamless manner to train a model.

The job execution engine 130 is also configured to enable the decision force assistant 110 to fetch the at least one input file for execution of the one or more job requests on the one or more web-based notebooks. For one or more artificial intelligence (AI) or machine learning (ML) models, the job execution engine requires various iterations to run the ML procedures by tuning one or more hyper parameters and run the same job in order to get accuracies of the one or more ML models. The job execution engine 130 of a decision force platform has intelligence to automatically extract configurable hyper parameters in a tabular format so that the users are able to update the one or more hyper parameters in a table and may re-run jobs without limitations until desired accuracies is achieved.

The job execution engine 130 is also configured to generate a job associated output upon execution of the at least one input file corresponding to the one or more job requests on the one or more web-based notebooks. In one embodiment, the job associated output may include a job execution result delivered to a user in a predefined format for decision making of the one or more projects. In such embodiment, the predefined format may include, but not limited to a text format, a voice format and the like. The decision force engine manages different sources for processing the notebooks and processes the one or more job requests. Subsequently, the job execution result is delivered to the user with a summary in text or voice, along with detailed information and artifacts for decision making.

The job execution engine 130 is also configured to generate a job execution status for storing in a status information database based on the job associated output generated. In one embodiment, the job execution status may include a successful execution status and a failed execution status. Once the one or more web-based notebook executions are completed, then the decision force assistant sends the job execution status along with execution log to the decision force engine. The decision force engine updates the job execution status into the status information database and terminates the one or more K8 clusters.

Figure 3:
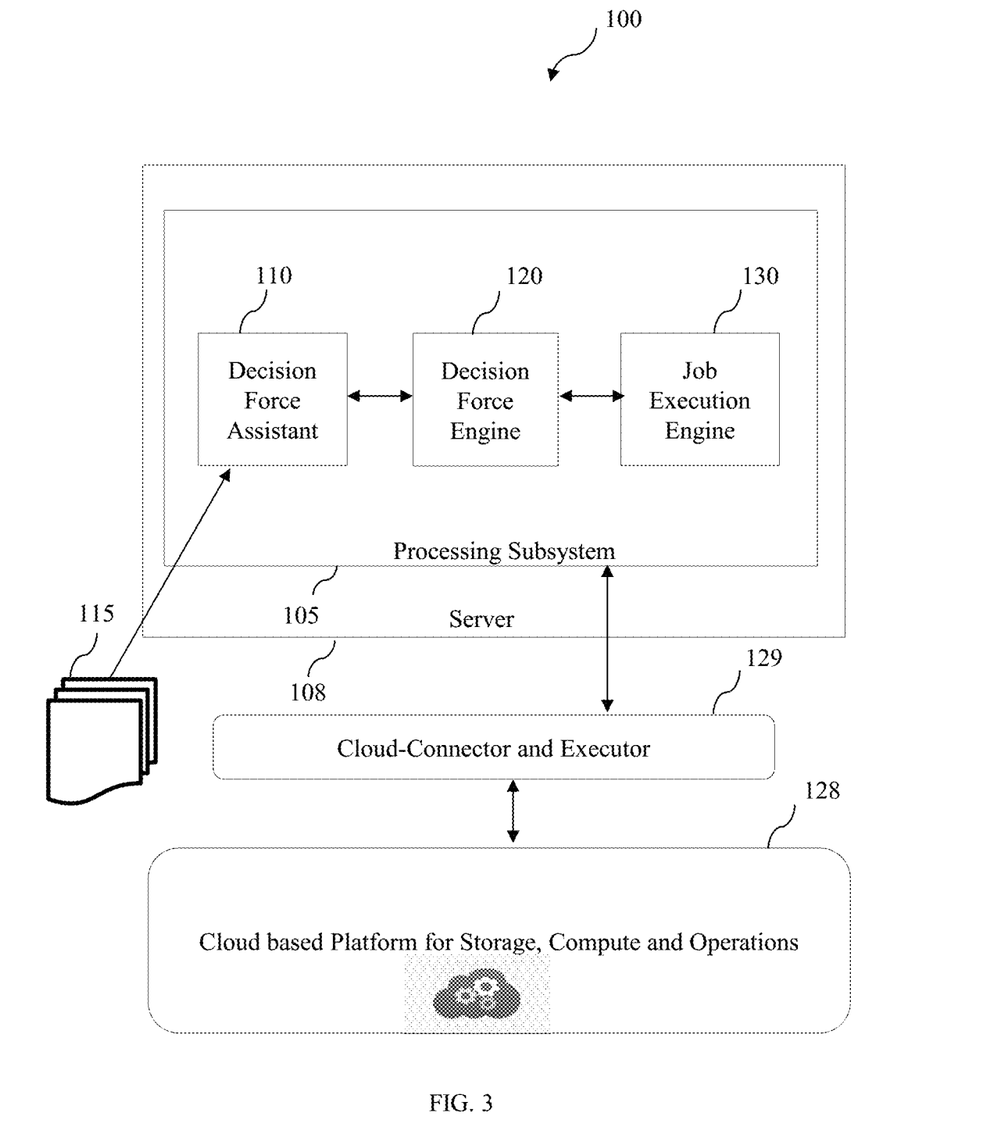
FIG. 3 illustrates a schematic representation of an exemplary embodiment of a system for notebook processing to handle job execution in cross-cloud environment of FIG. 1 in accordance with an embodiment of the present disclosure.

FIG. 3 illustrates a schematic representation of an exemplary embodiment 100 of a system for notebook processing to handle job execution in cross-cloud environment of FIG. 1 in accordance with an embodiment of the present disclosure. The system 100 is utilized in field of data science and data processing of running codes on a cloud infrastructure. Considering an example, where the system 100 is utilized for executing one or more data science projects in a financial organization. Generally, the financial organization requires the one or more data science projects for fraud detection in order to find anomalous transactions and insurance scams. One or more employees of the financial organization generally have less knowledge and expertise related to data science domain. As a result, execution of the one or more projects without domain knowledge becomes a challenging task. The system 100 executes a sequence of notebooks belonging to the one or more business projects of the financial organization, with an interface to inject parameters using an AI assistant and interact with processed output. The system 100 includes a processing subsystem 105 hosted on a server 108 which includes a decision force assistant 110 configured to receive one or more job requests representative of execution of one or more projects from one or more sources 115 in one or more formats. For example, the one or more job requests may include one or more machine learning based job requests for training or testing one or more machine learning models for fraud detection of financial transaction. In the example used herein, the one or more job requests are received from the one or more sources 115 which may include, but not limited to, a user or a scheduled event for triggering the one or more job requests. The one or more job requests from the one or more sources are collected using an application interface (API). Here, the one or more job requests are received in the one or more formats which may include at least one of a voice format, a text format or a combination thereof.

Once, the one or more job requests are received, a decision force assistant 110 parses the one or more job requests received for interpretation using a data parsing technique. For example, the one or more job requests may be received in a user understandable language such as 'English'. Such one or more job requests in the 'English' language are parsed using at least one of a recursive descent parsing technique, a predictive parsing technique, a left-left (LL) parsing technique, a left-right (LR) parsing technique, a simple left-right (SLR) parsing technique or a look ahead left-right (LALR) parsing technique. Parsing of the one or more job requests helps in understanding business requirement associated with the one or more projects.

Upon parsing, whenever a new job request arrives, a Decision Force engine 120 launches one or more virtual machines (VMs) on a cloud-based platform 128. Upon successful VM launch, the decision force assistant registers the VM details to the Decision Force engine. The Decision force engine further sends the one or more job instructions to the launched VM via an advanced message queuing protocol (AMQP) message. For example, the one or more virtual machines (VMs) are launched on an external cloud-based platform provided by a cloud service provider for performing one or more cloud computing services. The one or more virtual machines are launched on the cloud-based platform 128 using a corresponding cloud service provider's application programming interface (API) or cloud connectors and executors (129). In the example used herein, the external cloud-based platform may include, but not limited to, an amazon web Services™ (AWS) cloud-based platform.

Once, the one or more VMs are launched, Kubernetes™ clusters are launched on demand for automating computer application deployment, scaling, and management. The Kubernetes is feasibly applied to manage the one or more virtual machines that normally runs in a cloud or virtualization platform. The Kubernetes (K8) clusters helps one or more data scientists to abstract to manage cloud resources and let the one or more data scientists or users to focus on their business models. The decision force assistant also provides a user-friendly interface by hiding launching of the one or more K8 cluster complexities from the users and minimize the launching or managing clusters development operations (DevOps) skills.

Again, after successful launching of the one or more VMs, the decision force engine 120 sends one or more job instructions associated with the one or more job requests to the decision force assistant 110 via the AMQP messaging technique. The decision force engine 120 also enables the decision force assistant 110 to fetch at least one input file corresponding to the one or more job instructions from an external storage repository. For example, the at least one input file may include at least one of an input data source file, at least one machine learning code file, at least one configuration file or a combination thereof. In such an example, the at least one input data source file may include one or more input datasets associated with one or more real-life business use cases. Similarly, the at least one machine learning code file may include at least one of a file of one or more machine learning procedures, a file of one or more machine learning data models or a combination thereof.

Further for execution of the one or more job requests, a job execution engine 130 of the processing subsystem, runs one or more web-based notebooks in a sequential manner by importing a notebook configuration file from the external storage repository. In the example used herein, the web-based notebook may include a Jupyter™ Notebook to execute the one or more data science models. The job execution engine 130 also enables the decision force assistant to fetch the at least one input file for execution of the one or more job requests on the web-based notebook. For one or more artificial intelligence (AI) or machine learning (ML) models, the job execution engine requires various iterations to run the ML procedures by tuning one or more hyper parameters and run the same job in order to get accuracies of the one or more ML models. The job execution engine of a decision force platform has intelligence to automatically extract configurable hyper parameters in a tabular format so that the users are able to update the one or more hyper parameters in a table and may re-run jobs without limitations until desired accuracies is achieved. The automatic extraction of the one or more hyper parameters for the one or more machine learning models eliminate requirement of the one or more data scientists to provide the inputs to the defined machine learning procedure or tune the one or more hyperparameters manually and yields results quickly instead of several days.

The job execution engine 130 also generates a job associated output upon execution of the at least one input file corresponding to the one or more job requests on the web-based notebook. For example, the job associated output may include a job execution result delivered to a user in a predefined format for decision making of the one or more projects. In such an example, the predefined format may include, but not limited to a text format, a voice format and the like. Moreover, the job execution engine also generates a job execution status, herein the job execution status is stored in a status information database based on the job associated output generated. For example, the job execution status may include a successful execution status and a failed execution status. Once the one or more web-based notebook executions are completed, then the decision force assistant sends the job execution status along with execution log to the decision force engine. The decision force engine updates the job execution status into the status information database and terminates the one or more K8 clusters. Thus, the system 100 runs the one or more job requests and makes democratization of data science projects real. Also, the system 100 eliminates requirement of one or more non-technical users to learn the steps to run the one or more ML models with complexities of cloud constructs. The system not only abstracts complexities of the ML models and infrastructure related parameters for easy use of job submission, but also it allows the one or more job requests to be submitted in a simple text or voice commands, changing the paradigm for submitting jobs and interpreting results.

Figure 4:
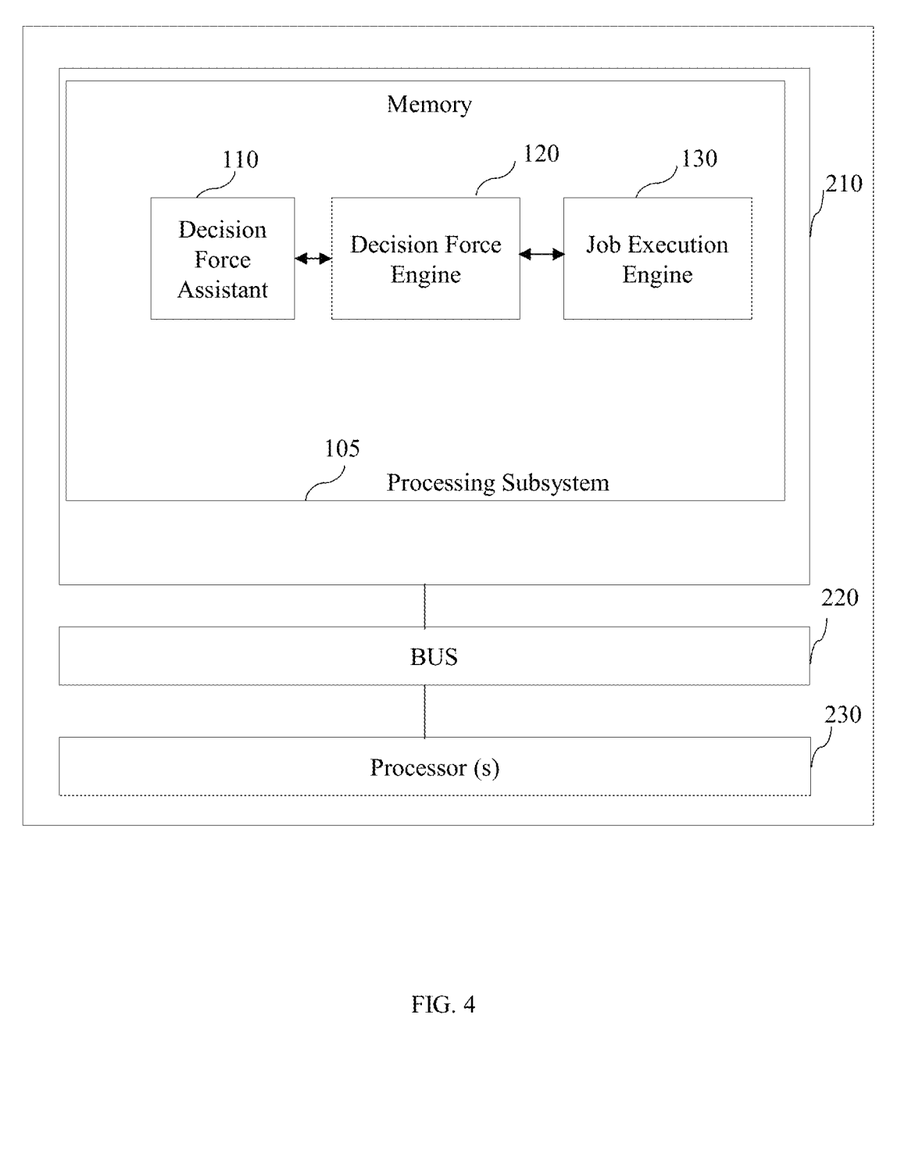
FIG. 4 is a block diagram of a computer or a server in accordance with an embodiment of the present disclosure.

FIG. 4 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor 230 to perform the method steps illustrated in FIG. 1. The memory 210 is substantially similar to a system 100 of FIG. 1. The memory 210 has following elements: a processing subsystem which includes a decision force assistant 110, a decision force engine 120 and a job execution engine 130.

The processing subsystem 105 includes a decision force assistant 110 configured to receive one or more job requests representative of execution of one or more projects from one or more sources in one or more formats. The decision force assistant 110 is also configured to parse the one or more job requests received for interpretation using a data parsing technique. The processing subsystem also includes a decision force engine 120 configured to launch one or more virtual machines on a cloud-based platform based on the one or more job requests received. The decision force engine 120 is also configured to send one or more job instructions associated with the one or more job requests to the decision force assistant via a messaging technique upon successful launching of the one or more virtual machines. The decision force engine 120 is also configured to enable the decision force assistant to fetch at least one input file corresponding to the one or more job instructions from an external storage repository. The processing subsystem also includes a job execution engine 130 configured to run one or more web-based notebooks in a sequential manner by importing a notebook configuration file from the external storage repository. The job execution engine 130 is also configured to enable the decision force assistant to fetch the at least one input file for execution of the one or more job requests on the one or more web-based notebooks. The job execution engine 130 is also configured to generate a job associated output upon execution of the at least one input file corresponding to the one or more job requests on the one or more web-based notebooks. The job execution engine 130 is also configured to generate a job execution status for storing in a status information database based on the job associated output generated.

The bus 220 as used herein refers to be internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein, may include but not limited to, a system bus, an internal bus, an external bus, an expansion bus, a frontside bus, a backside bus and the like.

Figure 5:
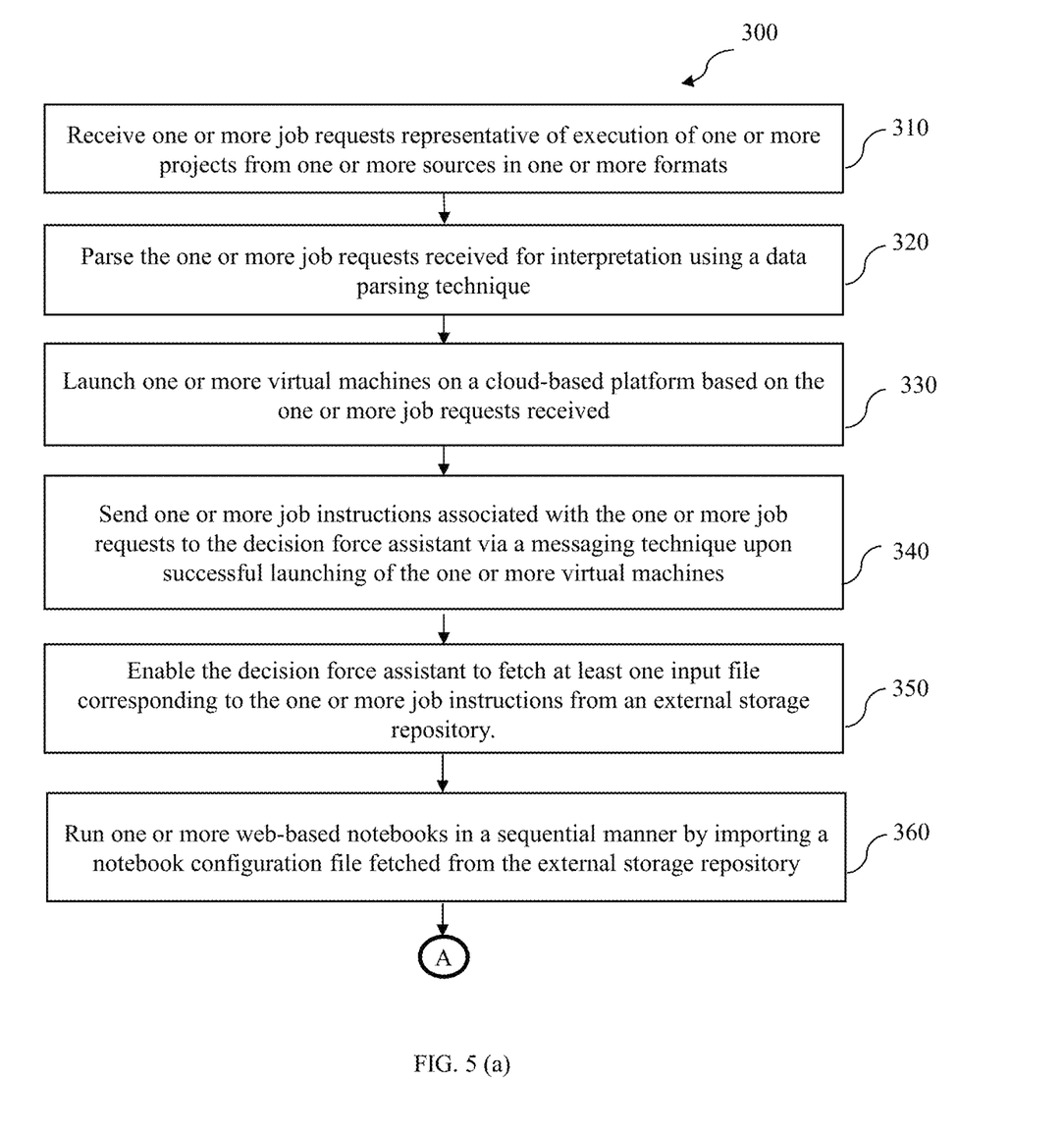
FIGS. 5(a) and 5(b) is a flow chart representing the steps involved in a method for notebook processing to handle job execution in cross-cloud environment in accordance with the embodiment of the present disclosure.

FIG. 5 is a flow chart representing the steps involved in a method 300 for notebook processing to handle job execution in cross-cloud environment in accordance with the embodiment of the present disclosure. The method 300 includes receiving, by a decision force assistant, one or more job requests representative of execution of one or more projects from one or more sources in one or more formats in step 310. In one embodiment, receiving the one or more job requests representative of the execution of the one or more projects may include receiving one or more machine learning based job requests for training or testing one or more machine learning models. In such embodiment, the one or more job requests are received from the one or more sources which may include, but not limited to, a user or a scheduled event for triggering the one or more job requests. In one embodiment, the one or more formats may include at least one of a voice format, a text format or a combination thereof.

The method 300 also includes parsing, by the decision force assistant, the one or more job requests received for interpretation using a data parsing technique in step 320. In one embodiment, parsing the one or more job requests received for the interpretation using the data parsing technique may include parsing the one or more job requests using a recursive descent parsing technique, a predictive parsing technique, a left-left (LL) parsing technique, a left-right (LR) parsing technique, a simple left-right (SLR) parsing technique or a look ahead left-right (LALR) parsing technique.

The method 300 also includes launching, by the decision force engine, one or more virtual machines on a cloud-based platform based on the one or more job requests received in step 330. In one embodiment, launching the one or more virtual machines (VMs) on the cloud-based platform based on the one or more job requests may include launching the one or more virtual machines (VMs) on an external cloud-based platform provided by a cloud service provider for performing one or more cloud computing services. In such embodiment, the one or more virtual machines are launched on the cloud-based platform using a corresponding cloud service provider's application programming interface (API). In a specific embodiment, the external cloud-based platform may include, but not limited to, an Amazon Web Services™ (AWS) cloud-based platform, Microsoft Azure™ cloud-based platform and a Google™ cloud-based platform.

The method 300 also includes sending, by the decision force engine, one or more job instructions associated with the one or more job requests to the decision force assistant via a messaging technique upon successful launching of the one or more virtual machines in step 340. In some embodiment, sending the one or more job instructions associated with the one or more job requests to the decision force assistant via a messaging technique may include sending the one or more job instructions to the decision force assistant via an advanced message queuing protocol (AMQP) messaging technique which listens to an application programming interface to get the one or more job instructions.

The method 300 also includes enabling, by the decision force engine, the decision force assistant to fetch at least one input file corresponding to the one or more job instructions from an external storage repository in step 350. In one embodiment, enabling the decision force assistant to fetch the at least one input file may include enabling the decision force engine to fetch at least one of an input data source file, at least one machine learning code file, at least one configuration file or a combination thereof. In such embodiment, the at least one input data source file may include one or more input datasets associated with one or more real-life business use cases. In another embodiment, the at least one machine learning code file may include at least one of a file of one or more machine learning procedures, a file of one or more machine learning data models or a combination thereof.

The method 300 also includes running, by a job execution engine, one or more web-based notebooks in a sequential manner by importing a notebook configuration file fetched from the external storage repository in step 360. The method 300 also includes enabling, by the job execution engine, the decision force assistant to fetch the at least one input file for execution of the one or more job requests on the one or more web-based notebooks in step 370. In a specific embodiment, enabling the decision force assistant to fetch the at least one input file for execution of the one or more job requests on the one or more web-based notebooks may include execution of the one or more job requests on a Jupyter™ Notebook, PyCharm™ integrated development environment (IDE), RStudio™ IDE, Spark™ Notebook and the like.

The method 300 also includes generating, by the job execution engine, a job associated output upon execution of the at least one input file corresponding to the one or more job requests on the one or more web-based notebooks in step 380. In one embodiment, generating the job associated output upon execution of the at least one input file corresponding to the one or more job requests may include generating a job execution result delivered to a user in a predefined format for decision making of the one or more projects. In such embodiment, the predefined format may include, but not limited to a text format, a voice format and the like. The method 300 also includes generating, by the job execution engine, a job execution status for storage in a status information database based on the job associated output generated in step 390. In one embodiment, generating the job execution status for storage may include generating a successful execution status and a failed execution status.

Various embodiments of the present disclosure provide a system that interprets the request from the user and automatically parses the input parameters to run the project in cross cloud without human intervention in processing. Thus, the system helps in automation of the job execution which not only saves human effort but also saves time of job execution.

Moreover, the present disclosed system analyses huge amount of input datasets to understand pattern of the data learn by itself. Also, such a disclosed system provides a storage option in an external storage repository which enables storage of huge high volume dataset for any ML procedures and enables communication to the created procedures in a seamless manner via one or more cloud services provided by the one or more cloud service providers.

Furthermore, the present disclosed system not only abstracts the model and infrastructure related parameters for easy use of job submission, but also it allows the requests to be submitted in a simple text or voice commands, changing the paradigm for submitting jobs and interpreting results.

In addition, the present disclosed system provides a contextual search option which allows interactive actions to execute and maps all interactions. Also, the system uses an event model to streamline peer-to-peer interactions based on the request to notify users or recommendations to take next step actions.

Furthermore, the present disclosed system makes the search, peer collaboration and job execution all in an integrated system. This increases self-service usage resulting in eliminating back-and-forth steps between users and data scientists and provides better productivity of any organization.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A notebook processing system for job execution in cross-cloud environment comprising:
   a processor; and
   a memory coupled to the processor, hosted on a server wherein the memory comprises a set of program instructions in the form of a processing subsystem, configured to be executed by the processor, wherein the processing subsystem comprises:
      a decision force assistant configured to:
         receive one or more job requests representative of execution of one or more projects from one or more sources in one or more formats; and
         parse the one or more job requests received for interpretation using a data parsing technique;
      a decision force engine operatively coupled to the decision force assistant, wherein the decision force engine is configured to:
         launch one or more virtual machines on a cloud-based platform based on the one or more job requests received;
         send one or more job instructions associated with the one or more job requests to the decision force assistant via a messaging technique upon successful launching of the one or more virtual machines; and
         enable the decision force assistant to fetch at least one input file corresponding to the one or more job instructions from an external storage repository; and
      a job execution engine operatively coupled to the decision force engine, wherein the job execution engine is configured to:
         run one or more web-based notebooks in a sequential manner by importing a notebook configuration file from the external storage repository;
         enable the decision force assistant to fetch the at least one input file for execution of the one or more job requests on the one or more web-based notebooks;
         generate a job associated output upon execution of the at least one input file corresponding to the one or more job requests on the one or more web-based notebooks; and
         generate a job execution status for storing in a status information database based on the job associated output generated.

2. The system of claim 1, wherein the one or more job requests comprises one or more machine learning based job requests for training or testing one or more machine learning models.

3. The system of claim 1, wherein the one or more sources of the one or more job requests comprises a user or a scheduled event for triggering the one or more job requests.

4. The system of claim 1, wherein the one or more formats comprises at least one of a voice format, and a text format.

5. The system of claim 1, wherein the data parsing technique comprises a recursive descent parsing technique, a predictive parsing technique, a left-left parsing technique, a left-right parsing technique, a simple left-right parsing technique or a look ahead left-right parsing technique.

6. The system of claim 1, wherein the one or more virtual machines are launched on an external cloud-based platform provided by a cloud service provider for performing one or more cloud computing services.

7. The system of claim 1, wherein the decision force engine is configured to launch the one or more virtual machines on the cloud-based platform using a corresponding cloud service provider's application programming interface.

8. The system of claim 1, wherein the messaging technique comprises an advanced message queuing protocol messaging technique to listen to an application programming interface to get the one or more job instructions.

9. The system of claim 1, wherein the decision force assistant is configured to register one or more details of the one or more virtual machines to the decision force engine.

10. The system of claim 1, wherein the at least one input file comprises at least one of an input data source file, at least one machine learning code file, and at least one configuration file.

11. The system of claim 10, wherein the at least one input data source file comprises one or more input datasets associated with one or more real-life business use cases.

12. The system of claim 10, wherein the at least one machine learning code file comprises at least one of a file of one or more machine learning procedures, and a file of one or more machine learning models.

13. The system of claim 1, wherein the external storage repository comprises a cloud storage bucket of an external service provider, wherein the cloud storage bucket is connected via a cloud connector and an executor.

14. The system of claim 1, wherein the external storage repository is configured to store the at least one input file securely in an encrypted mode.

15. The system of claim 1, wherein the job associated output comprises a job execution result delivered to a user in a predefined format for decision making of the one or more projects.

16. The system of claim 1, wherein the job execution status comprises a successful execution status and a failed execution status.

17. A method comprising:
   receiving, by a decision force assistant, one or more job requests representative of execution of one or more projects from one or more sources in one or more formats;
   parsing, by the decision force assistant the one or more job requests received for interpretation using a data parsing technique;
   launching, by the decision force engine, one or more virtual machines on a cloud-based platform based on the one or more job requests received;
   sending, by the decision force engine, one or more job instructions associated with the one or more job requests to the decision force assistant via a messaging technique upon successful launching of the one or more virtual machines;
   enabling, by the decision force engine, the decision force assistant to fetch at least one input file corresponding to the one or more job instructions from an external storage repository;
   running, by a job execution engine, one or more web-based notebooks in a sequential manner by importing a notebook configuration file fetched from the external storage repository;
   enabling, by the job execution engine, the decision force assistant to fetch the at least one input file for execution of the one or more job requests on the one or more web-based notebooks;
   generating, by the job execution engine, a job associated output upon execution of the at least one input file corresponding to the one or more job requests on the one or more web-based notebooks; and generating, by the job execution engine, a job execution status for storage in a status information database based on the job associated output generated.

\* \* \* \* \*